United States Patent

Tenenbaum

[15] 3,689,807

[45] Sept. 5, 1972

[54] PUT TIME DELAY RELAY

[72] Inventor: Mircea M. Tenenbaum, New Haven, Conn.

[73] Assignee: Allied Control Company, Inc., Plantsville, Conn.

[22] Filed: Feb. 3, 1971

[21] Appl. No.: 112,133

[52] U.S. Cl. ................................317/141 S, 317/153

[51] Int. Cl. ........................H01h 47/18, H01h 47/36

[58] Field of Search .........317/141 S, 153; 307/252 F

[56] References Cited

UNITED STATES PATENTS 3,571,665 3/1971 Hayden ..................317/141 S

*Primary Examiner*—L. T. Hix

*Attorney*—F. J. Pisarra

[57] ABSTRACT

A time delay relay utilizes a programmable unijunction transistor (PUT) wherein the junction of a resistor-capacitor timing circuit is connected to the gate electrode of the PUT and the coil of an electromechanical relay is connected to the anode of the PUT. The firing of the PUT and consequently the current flow through the relay coil is determined by the anode-gate voltage which exponentially changes from an initial cut off value at the start of the timing interval.

7 Claims, 2 Drawing Figures

INVENTOR.
MIRCEA TENENBAUM
BY F. J. Pisarra
Attorney

PUT TIME DELAY RELAY

BACKGROUND OF THE INVENTION

This invention pertains to time delay relays and more particularly to such relays using solid state elements.

Time delay relays have many uses. However, all such uses require the same type of function, i.e., that a controlled operation occur a given known period of time after a controlling operation.

Initially, most time delay relays required mechanical or thermal phenomena to control the timing operation. These devices were generally bulky, imprecise and subject to rapid wear. With the advent of vacuum tube and solid state devices, there appeared time delay relays which relied on the build up or decay of energy in reactive circuits. This technology has proceeded to the point where unijunction transistors became the prime active component in such solid state time delay relays.

The operation of unijunction timing circuits relies on a parameter called "the stand-off ratio." It is known that the stand-off ratio varies among unijunction transistors of the same type by from 20 to 70 percent depending on the quality and cost of the transistor. For the mass production of timing devices such as time delay relays, such a variation requires that each device be individually calibrated, thus increasing the cost of the device.

Furthermore, conventional unijunction transistor timing circuits are, in fact, oscillators which emit a train of pulses at a given repetition rate. Therefore, in order to get a single "snap" action in the timing circuit, a latching device which is triggered by the first pulse must be used. The addition of a latching device, such as a silicon-controlled rectifier, further increases both the cost and the complexity of the circuit. Moreover, the latching device imposes timing limitations on the unijunction transistor timing circuit, thus limiting its range of operation. Another solution to the problem is to decrease the value of the timing resistor to prevent oscillations. However, then to obtain time delays in the range of seconds requires prohibitively large timing capacitors. Another solution is to add latching resistors in series with the relay per se. Such a technique requires careful specification of pull-in and drop-out currents, again adding to the cost of the device.

SUMMARY OF THE INVENTION

Briefly, the invention contemplates a time delay relay utilizing a programmable unijunction transistor. A first series circuit comprising a time resistor and a timing capacitor is connected across the two input terminals of the relay, and a second series circuit comprising a relay coil and a resistor is also connected across the two input terminals. The anode electrode of the programmable unijunction transistor is connected to the junction of the relay coil and the resistor, the gate electrode of the programmable unijunction transistor is connected to the junction of the timing capacitor and timing resistor, and the cathode electrode of the programmable unijunction transistor is connected to one of the input terminals.

It should be noted that by using a programmable unijunction transistor the triggering and latching functions are performed by the same device and no extra circuit elements are required. In addition, such timing circuits can introduce delays up to several hundred seconds. Finally, and most important, the stand-off ratio is not a function of the transistor but only of the external resistors. Therefore, it can be controlled within very tight tolerances and, thus, does not require custom calibration. Furthermore, the timing tolerances are determined solely by the components external to the transistor and are easily controlled.

One object of this invention is to provide a time delay relay using solid state elements and having improved design features and operating characteristics.

Another object of this invention is to provide an improved time delay relay which is devoid of the earlier-described objections and problems.

Other objects, as well as the features and advantages of the invention, will be apparent from the following detailed description taken in conjunction with the accompanying drawing which shows, by way of example, and not limitation, two embodiments of the invention.

BRIEF DESCRIPTION OF THE DRAWING

In the drawing, wherein like reference characters denote corresponding parts in the several views.

DESCRIPTION OF THE PREFERRED EMBODIMENTS

Figure 1:
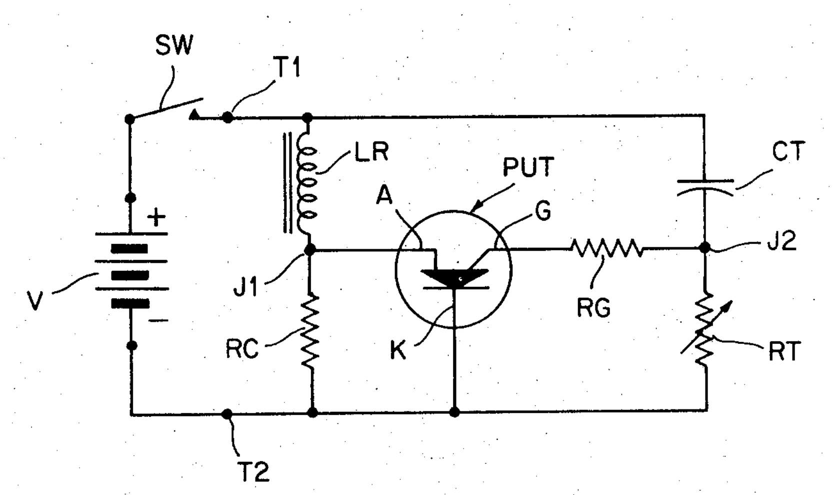
FIG. 1 is a schematic diagram of a pull-in or energizing time delay relay according to the invention.

In FIG. 1, the time delay relay is shown centered around the programmable unijunction transistor PUT having an anode electrode A, a cathode electrode K and a gate electrode G. The anode electrode A is connected to the junction J1 of the series circuit comprising the current limiting resistor RC and the relay coil LR (the contact sets of the electromechanical relay having coil LR are not shown) which is connected across the input terminals T1 and T2 of the time delay relay. The gate electrode G is connected via a gate current limiting resistor RG to the junction J2 of the series circuit comprising a timing capacitor CT and a timing resistor RT which is also connected across input terminals T1 and T2. The cathode electrode K is connected to terminal T2. Connected across the input terminals T1 and T2 is the series circuit comprising a switch SW and a battery V whose negative terminal is connected to input terminal T2. Although switch SW is shown as a mechanical single-pole single-throw switch, it can take many forms, either mechanical or electronic, as long as it performs the function of controllably connecting the positive terminal of battery V to input terminal T1.

The purpose of the time delay relay is to energize the relay having the coil LR a given period of time after switch SW is closed, the time interval being determined by the time constant of the series circuit including timing capacitor CT and timing resistor RT. Resistor RT is shown variable so that the time constant can be readily changed or adjusted.

The operation of the relay will now be described. Initially switch SW is open and timing capacitor CT is discharged. When switch SW is closed, current flows in the series circuit including relay coil LR and resistor RC. The resistance of resistor RC is chosen so that the current through this series circuit is insufficient to energize the electromechanical relay associated with coil LR. However, a fraction kV of the total voltage of battery V is present at junction J1. At the same time, junction J2 is at the total voltage V of the battery and the programmable unijunction transistor PUT is cut off. However, as capacitor CT accumulates charge, the voltage at junction J2 exponentially falls toward and below voltage kV of junction J1. When the voltage at junction J2 becomes slightly negative with respect to the voltage at junction J1, programmable unijunction transistor PUT "fires" closing a conduction path between the anode A and the cathode K. Now heavy current flows from terminal T1, through coil LR and, via the anode A and cathode K, to terminal T2, the current being sufficient to energize the electromechanical relay. The programmable unijunction transistor PUT will continue conducting as long as this current flows, i.e., as long as switch SW is closed.

Figure 2:
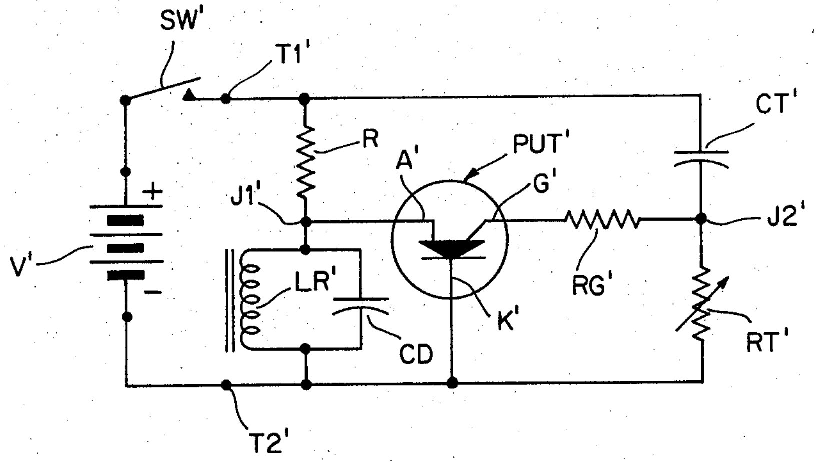
FIG. 2 is a schematic diagram of a time interval time delay relay according to the invention.

In FIG. 2 a variation of the time delay relay is shown wherein the electromechanical relay is energized for only a given time interval. Since most of the components of the time delay relay of FIG. 2 are the same as the components of the time delay relay of FIG. 1, primed reference characters are used for like components and only the differences will be discussed. The basic difference is that relay coil LR′ is shunted by the anode-cathode path of programmable unijunction transistor PUT′, whereas in FIG. 1 current limiting resistor RC was in shunt with the anode-cathode path of programmable unijunction transistor PUT. The other difference is that the resistance of resistor R is low enough to pass sufficient current to coil LR′ for energizing the electromechanical relay. Thus, when switch SW′ is initially closed, sufficient current flows from terminal T1 via resistor R and coil LR′ to terminal T2 to cause the electromechanical relay to immediately energize. When the programmable unijunction transistor PUT′ fires after the time delay, as described above, the current from resistor R is shunted around coil LR′ via the anode-cathode path of the programmable unijunction transistor PUT′ and the electromechanical relay is deenergized. Since the current in coil LR′ is interrupted, a damping capacitor CD is connected across this coil. Thus the electromechanical relay operates only for a given period of time after switch SW′ is closed.

There will now be obvious to those skilled in the art many modifications and variations satisfying many or all of the objects of the invention but which do not depart from the spirit of the invention as defined by the appended claims.

I claim:

1. A time delay relay comprising a programmable unijunction transistor having anode, cathode and gate electrodes; first and second input terminals; a first series circuit comprising a relay coil and a first resistor connected across said first and second input terminals; a second series circuit comprising a timing capacitor and a timing resistor connected across said first and second input terminals; said anode electrode being connected to the junction of said relay coil and said first resistor, and said cathode electrode being connected to one of said input terminals; and means for connecting said gate electrode to the junction of said timing capacitor and said timing resistor so that the state of conductivity of said transistor controls the flow of current through said relay coil.

2. The time delay relay of claim 1 wherein said means for connecting said gate electrode to the junction of said timing capacitor and said timing resistor to said gate electrode is a current limiting resistor.

3. The time delay relay of claim 2 wherein said first resistor is connected across said anode and cathode electrodes to provide a delayed-operating time delay relay.

4. The time delay relay of claim 2 wherein said relay coil is connected across said anode and cathode electrodes to provide a time interval time delay relay.

5. The time delay relay of claim 2 further comprising a power supply; and switching means for selectively connecting said power supply across said first and second input terminals.

6. The time delay relay of claim 5 wherein said first resistor is connected across said anode and cathode electrodes to provide a delayed-operating time delay relay.

7. The time delay relay of claim 5 wherein said relay coil is connected across said anode and cathode electrodes to provide a time interval time delay relay.

* * * * *